(12) United States Patent
Nader

(10) Patent No.: US 11,396,912 B2
(45) Date of Patent: Jul. 26, 2022

(54) CLUTCH HUB ASSEMBLY WITH IMPROVED OIL FLOW

(71) Applicant: Sonnax Transmission Company, Bellows Falls, VT (US)

(72) Inventor: Gregg A. Nader, Chester, VT (US)

(73) Assignee: Sonnax Transmission Company, Bellows Falls, VT (US)

(*) Notice: Subject to any disclaimer, the term of this patent is extended or adjusted under 35 U.S.C. 154(b) by 0 days.

(21) Appl. No.: 16/885,562

(22) Filed: May 28, 2020

(65) Prior Publication Data
US 2021/0372489 A1 Dec. 2, 2021

(51) Int. Cl.
*F16D 25/12* (2006.01)
*F16D 25/10* (2006.01)
*F16D 25/0638* (2006.01)

(52) U.S. Cl.
CPC ....... *F16D 25/123* (2013.01); *F16D 25/0638* (2013.01); *F16D 25/10* (2013.01)

(58) Field of Classification Search
CPC .................. F16D 25/123; F16D 13/72–74
See application file for complete search history.

(56) References Cited

U.S. PATENT DOCUMENTS

| | | | | |
|---|---|---|---|---|
| 5,172,799 A | * | 12/1992 | Iijima | F16D 25/0638 192/106 F |
| 6,142,280 A | * | 11/2000 | Koike | F16D 25/0638 192/113.34 |
| 2005/0183922 A1 | * | 8/2005 | Springer | F16D 25/12 192/70.12 |
| 2008/0121488 A1 | * | 5/2008 | Miyazaki | F16D 25/0638 192/70.12 |
| 2008/0142331 A1 | * | 6/2008 | Miyazaki | F16D 13/54 192/70.12 |
| 2008/0277232 A1 | * | 11/2008 | Miyazaki | F16D 25/123 192/70.12 |
| 2009/0250305 A1 | * | 10/2009 | Sawayanagi | F16D 25/123 192/70.12 |
| 2020/0246857 A1 | * | 8/2020 | Watanabe | F16D 13/52 |

* cited by examiner

*Primary Examiner* — David R Morris
(74) *Attorney, Agent, or Firm* — Levenfeld Pearlstein, LLC

(57) ABSTRACT

An automatic transmission includes a clutch hub assembly having a clutch hub and a housing assembly having a housing shaft and a piston dam. The clutch hub may define an inner portion between an outer radial wall, an inner radial wall and a forward axial wall, and extend about a central opening. The clutch hub may further include one or more first oil holes extending through the outer radial wall, one or more second oil holes extending through the inner radial wall, and an oil dam projecting radially inward from the inner radial wall. An oil flow path extends from the central opening through the one or more second oil holes, the inner portion, and the one or more first oil holes.

10 Claims, 11 Drawing Sheets

US 11,396,912 B2

CLUTCH HUB ASSEMBLY WITH IMPROVED OIL FLOW

BACKGROUND

The following description relates generally to a clutch hub, a clutch hub assembly, and an automatic transmission having a clutch hub assembly.

A step-ratio planetary style automatic transmission includes a plurality of multiple-disc wet-clutch packs. The wet-clutch packs can be operated to hold and release elements of a planetary gear set and mechanical clutches within the transmission to create, for example, forward reduction ratios, forward overdrive ratios, neutral and reverse reduction ratios and the like.

A conventional multiple-disc wet-clutch pack includes one or more internally toothed friction clutch plates and one or more externally toothed steel separator clutch discs. The friction clutch plates are typically formed as a steel core with bonded friction surfaces thereon. The separator clutch discs may be disposed between adjacent pairs of the friction clutch plates.

The multiple-disc wet-clutch pack has four basic functional states: (1) a fully released or "open" state in which the internally toothed friction clutch plates and the externally toothed steel separator clutch discs can move or rotate at different speeds relative to each other; (2) a fully applied or "closed" state in which the internally toothed friction clutch plates and the externally toothed steel separator clutch discs are locked together and move or rotate in unison; (3) a first transition state in which the clutch pack transitions from the released state to the applied state; and (4) a second transition state in which the clutch pack transitions from the applied state to the released state.

A conventional multiple-disc wet-clutch pack may fail when the friction clutch is damaged by heat. The most significant source of heat typically occurs in the first transition state when the clutch pack transitions from the released state to the applied state. Another significant source of heat can result from viscous shear in the fully released state and in the second transition state in which the clutch pack transitions from the applied state to the released state.

Accordingly, many automatic transmission multiple-disc wet-clutch packs are designed to direct oil to flow across the clutch plates to lubricate and cool the clutch plates. The oil may be provided from a pressurized source and is typically carried through and across clutch plate faces by centrifugal forces from rotating transmission components.

Such conventional automatic transmissions include the General Motors Hydra-Matic 6 Speed rear wheel drive transmission with the 6L45/6L50/6L80/6L90 designations. The General Motors Hydra-Matic 6 Speed rear wheel drive transmissions are considered Original Equipment, or "OE," transmissions, which are installed in vehicles by the manufacturer during original manufacturing of the vehicles. The General Motors Hydra-Matic 6 Speed rear wheel drive transmissions, and original components of the transmissions, may be prefaced herein using "OE" terminology. In the OE transmissions, a 4-5-6 clutch pack may have a relatively high failure rate and may experience high incidences of heat damage.

The OE transmissions have six forward ratios (speeds) and one reverse ratio. The 4-5-6 clutch pack is in the fully applied state when the transmission is the $4^{th}$, $5^{th}$ and $6^{th}$ gear ranges. The 4-5-6 clutch pack is in the fully released state when the transmission is in the $1^{st}$, $2^{nd}$ and $3^{rd}$ gear ranges.

FIGS. 1 and 2 illustrate examples of an OE 4-5-6 clutch hub assembly 110 of an OE automatic transmission. Referring to FIGS. 1 and 2, the OE 4-5-6 clutch hub assembly 110 includes an OE clutch hub 120, an OE hub shaft 130, an OE clutch dampener 140, an OE apply plate 150 and an OE retainer ring 160.

The OE clutch hub 120 has an interior portion 122 (FIG. 2) and a plurality of oil holes 124 extending between the interior portion 122 and a splined outer surface 126 so that oil can flow between the interior portion 122 and an exterior of the OE clutch hub 120. The OE clutch hub 120 is connected to the OE hub shaft 130 so that the OE clutch hub 120 and the OE hub shaft 130 rotate together.

The OE clutch dampener 140 is formed as an annular body having a first axial face 142 and a second axial face 144. The first axial face 142 includes a bonded friction material and has a plurality of grooves 146. The grooves 146 are circumferentially spaced and extend in a radial direction. The grooves 146 have a depth extending in an axial direction. The grooves 146 are configured to allow radially outward oil flow. The second axial face 144 includes a bonded friction material and forms a substantially flush and/or planar contact surface (i.e., non-grooved).

The OE apply plate 150 has a toothed outer circumference 152, a first axial face 154 facing the second axial face 144 of the clutch dampener 140 and a second axial face 156 facing away from the first axial face 154.

The OE retainer ring 160 is a waved spring that contacts the axial face 156 of the OE apply plate 150 and preloads the OE apply plate 150 and the OE clutch dampener 140 into the interior portion 122 of the OE clutch hub 120. The preload from the OE retaining ring 160 creates sealing surface between the OE apply plate 150 and the OE clutch dampener 140 at the second axial (non-grooved) face 144 of the OE clutch dampener 140 and the first axial face 154 of the OE apply plate 150. The preload also creates a partial sealing surface between a portion of the OE clutch hub 120 and the first axial face 142 of the clutch dampener 140, with oil flow through the grooves 146.

FIG. 3 is an exploded view showing the OE 4-5-6 clutch hub assembly 110, an OE 4-5-6 housing assembly 210 and an OE 1-2-3 clutch hub assembly 310 of the OE automatic transmission. A housing shaft thrust bearing 212 is disposed between the OE 4-5-6 clutch hub assembly 110 and the OE housing assembly 210. A clutch hub bearing 312 is disposed between the OE 4-5-6 clutch hub assembly 110 and the OE 1-2-3 clutch hub assembly 310.

FIG. 4 is an exploded view of the OE housing assembly 210 of FIG. 3. The OE 4-5-6 housing assembly 210 includes an OE housing body 220 and an OE housing shaft 230. An OE clutch piston 240, an OE clutch spring 250 and an OE clutch piston dam 260 are disposed along the OE housing shaft 230 within the OE housing body 220. A plurality of OE friction clutch plates 270 and a plurality of OE separator clutch discs 280 are positioned in the housing body 220 as well. The OE friction clutch plates 270 and the OE separator clutch discs 280 may form an OE multiple disc wet-clutch pack.

FIG. 5 is a diagram illustrating an example of the OE automatic transmission 510. The OE automatic transmission 510 includes the OE 4-5-6 clutch hub assembly 110 described above. Lubricating and cooling oil feeds in the OE automatic transmission 510 are shown as shaded and/or dotted paths. A rear oil feed 512 extends generally along a central axis and supplies oil to the OE automatic transmission 510 from a pressurized source. An OE oil feed 514 extends between the OE hub shaft 130 of the OE clutch hub assembly 110 and an OE hub shaft 330 of the OE 1-2-3 clutch hub assembly 310 (FIG. 3). A first oil feed 516 receives oil from the rear oil feed 512 and extends generally between a rear portion of the OE housing shaft 230 and a front portion of the OE hub shaft 130. The OE automatic transmission has an axially forward end indicated generally at 'F' and an axially rearward end indicated generally at 'R.' Accordingly, an axially forward direction extends generally toward the axially forward end 'F' and an axially rearward direction extends generally toward the axially rearward end 'R.'

FIG. 6 is a diagram illustrating an enlarged portion of the OE automatic transmission 510 of FIG. 5, including the portion generally shown at DETAIL A. An OE oil flow path OEP for lubricating and cooling oil for the OE 4-5-6 clutch hub assembly 110 is indicated in FIG. 6 by arrows and dotted lines. The OE oil flow path OEP receives oil from the OE oil feed 512 between the OE hub shaft 130 of the OE 4-5-6 clutch hub assembly 110 and the OE hub shaft 330 of the OE 1-2-3 clutch hub assembly 310.

The OE oil flow path OEP extends through the clutch hub thrust bearing 312 and into the interior portion 122 of the OE clutch hub 120 through a rearward facing, open side of the OE clutch hub 120. The OE oil flow path OEP extends around a radial inner side and the first axial face 142 of the OE clutch dampener 140 to an outer radial side of the OE clutch dampener 140. At the first axial face 142, the OE oil flow path extends through the grooves 146 (FIG. 1), between the OE clutch dampener 140 and the OE clutch hub 120. The OE oil flow path OEP then extends radially outward through the oil holes 124 of the OE clutch hub 120.

Accordingly, oil migrates along the OE oil flow path OEP through the clutch hub thrust bearing 312 and is caught by the OE apply plate 150. The oil is blocked by the second axial face 144 of the OE clutch dampener 140 and flows between OE clutch dampener 140 and the OE clutch hub 120 from an inner radial side of the OE clutch dampener 140, around the first axial face 142 via the grooves 146 to the outer axial side of the OE clutch dampener 140. The oil then flows through the oil holes 124 of the OE clutch hub 120 to exit the interior portion 122. In this manner, the oil may be supplied to the OE friction clutch plates 270 and the OE separator clutch discs 280 (i.e., the clutch pack).

However, in the OE automatic transmission 510, the lubricating and cooling oil may not be supplied to the OE 4-5-6 friction clutch plates 270 and the OE 4-5-6 clutch discs 280 in quantities sufficient to provide adequate cooling and lubrication, which may lead to overheating or damage.

Accordingly, it is desirable to provide a clutch hub assembly of an automatic transmission configured to allow for improved cooling and lubrication oil flow to clutch plates and steel separator plates.

SUMMARY

According to one embodiment, a clutch hub may include an annular channel-shaped body defining an inner portion between an outer radial wall, an inner radial wall and a forward axial wall, the annular channel-shaped body extending about a central opening. One or more first oil holes may extend through the outer radial wall, one or more second oil holes may extend through the inner radial wall, and an oil dam may extend radially inward from the inner radial wall. An oil flow path may extend from the central opening through the one or more second oil holes, the inner portion, and the one or more first oil holes.

The annular channel-shaped body may further include a connecting flange extending radially inward from the inner radial wall, the connecting flange positioned axially rearward from the oil dam. The outer radial wall has an outer surface, and the outer surface may include a plurality of splines. The annular channel-shaped body may have an axially rearward facing open side. Another oil flow path may extend into the inner portion through the axially rearward facing open side.

According to another embodiment, a clutch hub assembly may include a clutch hub defining an inner portion between an outer radial wall, an inner radial wall and a forward axial wall, the clutch hub extending about a central opening. One or more first oil holes may extend through the outer radial wall. One or more second oil holes may extend through the inner radial wall. An oil dam may extend radially inward from the inner radial wall. A connecting flange may extend radially inward from the inner radial wall and may be positioned axially rearward from the oil dam. A hub shaft may be connected to the connecting flange. A clutch dampener may be disposed in the inner portion, the clutch dampener having a first axial face having a plurality of grooves facing the forward axial wall and a second axial face facing an open side of the clutch hub. An apply plate may be positioned adjacent to the second axial face of the clutch dampener, and a retainer ring may be configured to apply a preload to the apply plate to urge the apply plate toward the second axial face of the clutch dampener and the first axial face of the clutch dampener toward the forward axial wall. An oil flow path may extend from the central opening through the one or more second oil holes into the inner portion, between the clutch dampener and the forward axial wall, and through the one or more first oil holes.

The outer radial wall may have an outer surface, and the outer surface including a plurality of splines. The oil flow path may extend in at least one groove of the plurality of grooves of the first axial face between the clutch dampener and the forward axial wall. The open side may face an axially rearward direction. Another oil flow path may extend into the inner portion through the axially rearward facing open side.

According to still another embodiment, an automatic transmission may include a clutch hub defining an inner portion between an outer radial wall, an inner radial wall and a forward axial wall, the clutch hub extending about a central opening. One or more first oil holes may extend through the outer radial wall, one or more second oil holes may extend through the inner radial wall, and an oil dam may extend radially inward from the inner radial wall. A connecting flange may extend radially inward from the inner radial wall, the connecting flange positioned axially rearward from the oil dam. A hub shaft may be connected to the connecting flange. A clutch dampener may be disposed in the inner portion, the clutch dampener having a first axial face having a plurality of grooves facing the forward axial wall and a second axial face facing an open side of the clutch hub. An apply plate may be positioned adjacent to the second axial face of the clutch dampener and a retainer ring may be configured to apply a preload to the apply plate to urge the apply plate toward the second axial face of the clutch dampener and the first axial face of the clutch dampener toward the forward axial wall. A housing assembly may include a housing shaft and a piston dam. The housing shaft may include one or more housing shaft oil holes and the piston dam may include one or more piston dam oil holes. An oil flow path may extend from the central opening through the one or more second oil holes into the inner portion, between the clutch dampener and the forward axial wall, and through the one or more first oil holes.

The oil flow path may be a first oil flow path, and the first oil flow path may further extend between the hub shaft and the shaft to the central opening. The oil flow path may be a second oil flow path, and the second oil flow path may further extend through the one or more housing shaft oil holes and the one or more piston dam oil holes to the central opening. The open side faces an axially rearward direction. Another oil flow path may extend into the inner portion through the axially rearward facing open side.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
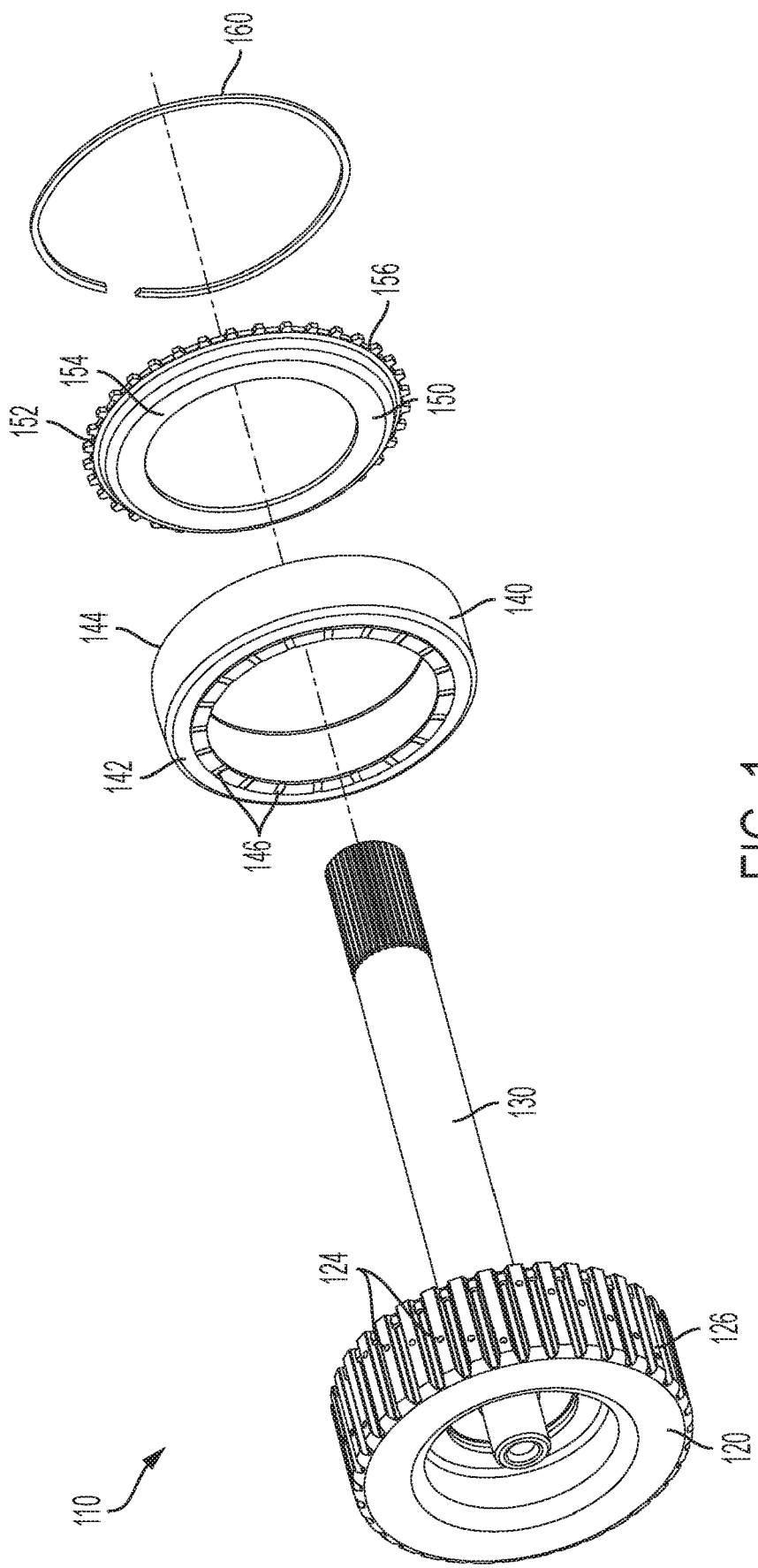
FIG. 1 is an exploded view illustrating a known OE 4-5-6 clutch hub assembly.
Figure 2:
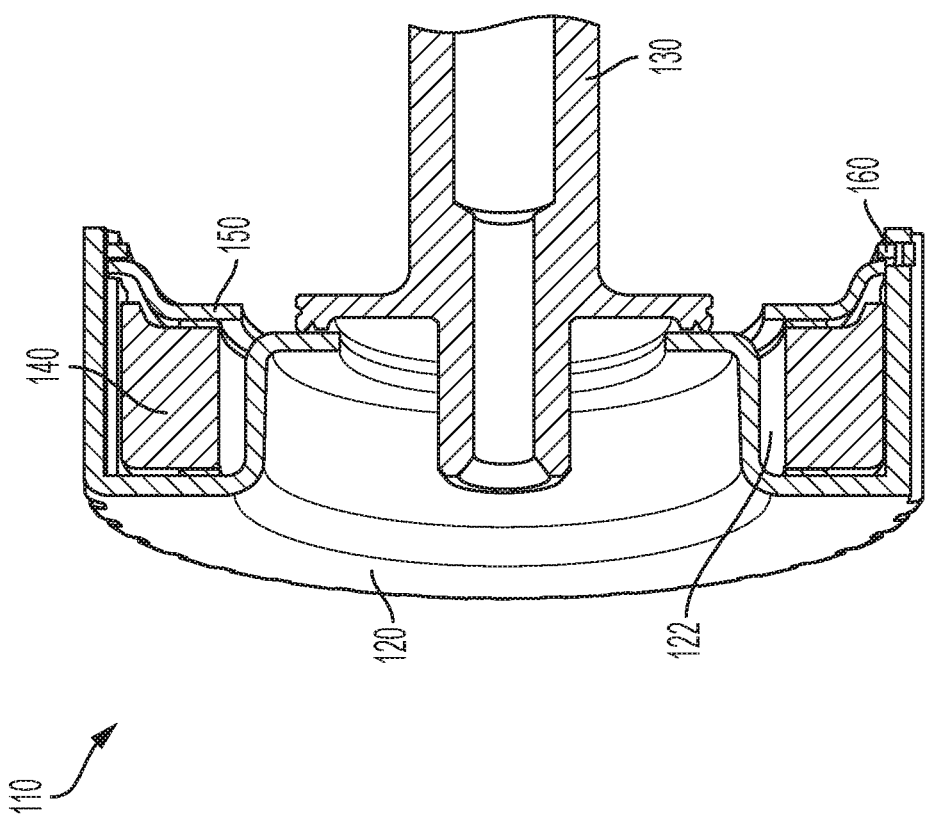
FIG. 2 is a cross-sectional view illustrating a known OE 4-5-6 clutch hub assembly.
Figure 3:
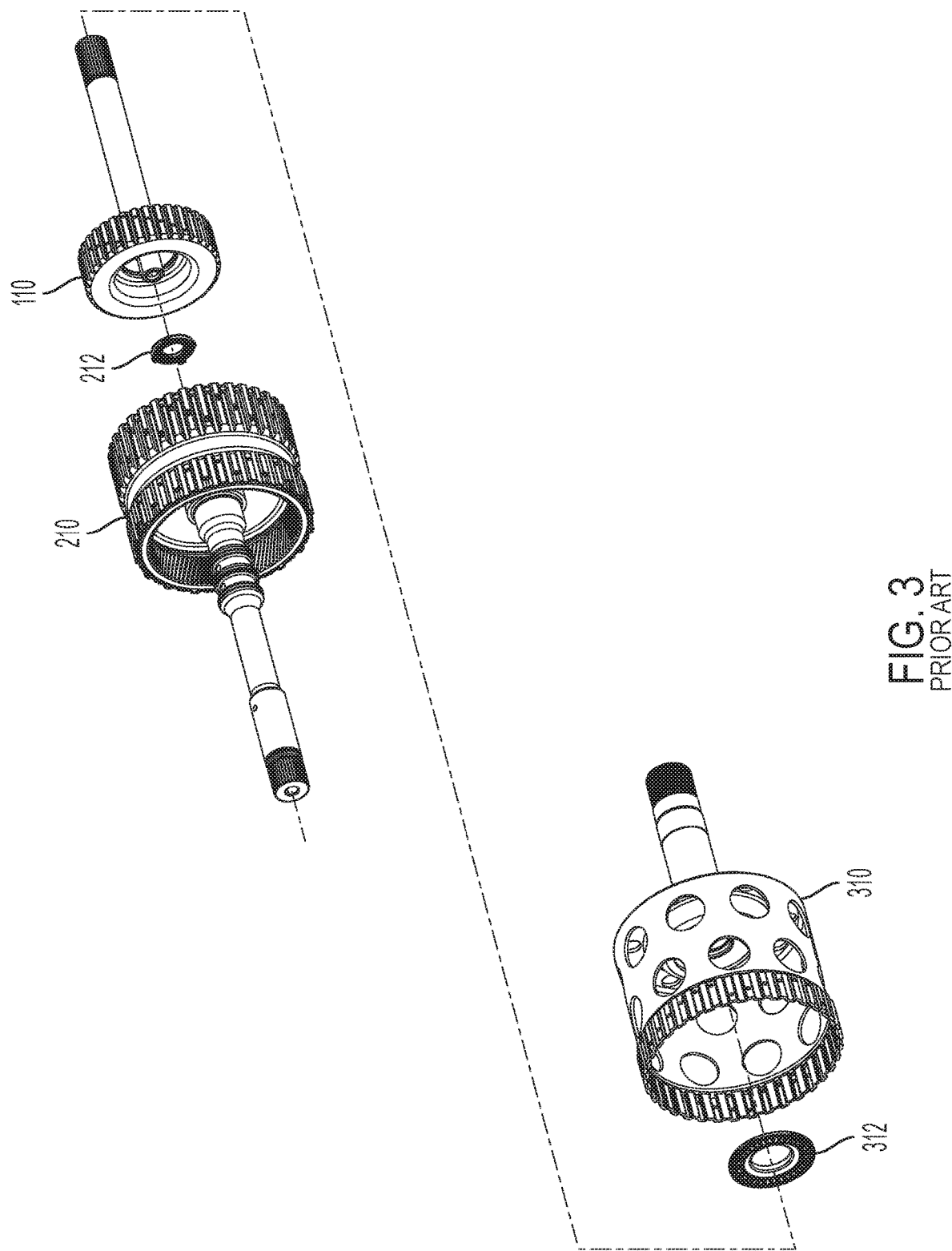
FIG. 3 is an exploded view illustrating a known OE 4-5-6 clutch hub assembly, a known OE 4-5-6 housing assembly and a known OE 1-2-3 clutch hub assembly of an OE automatic transmission.
Figure 4:
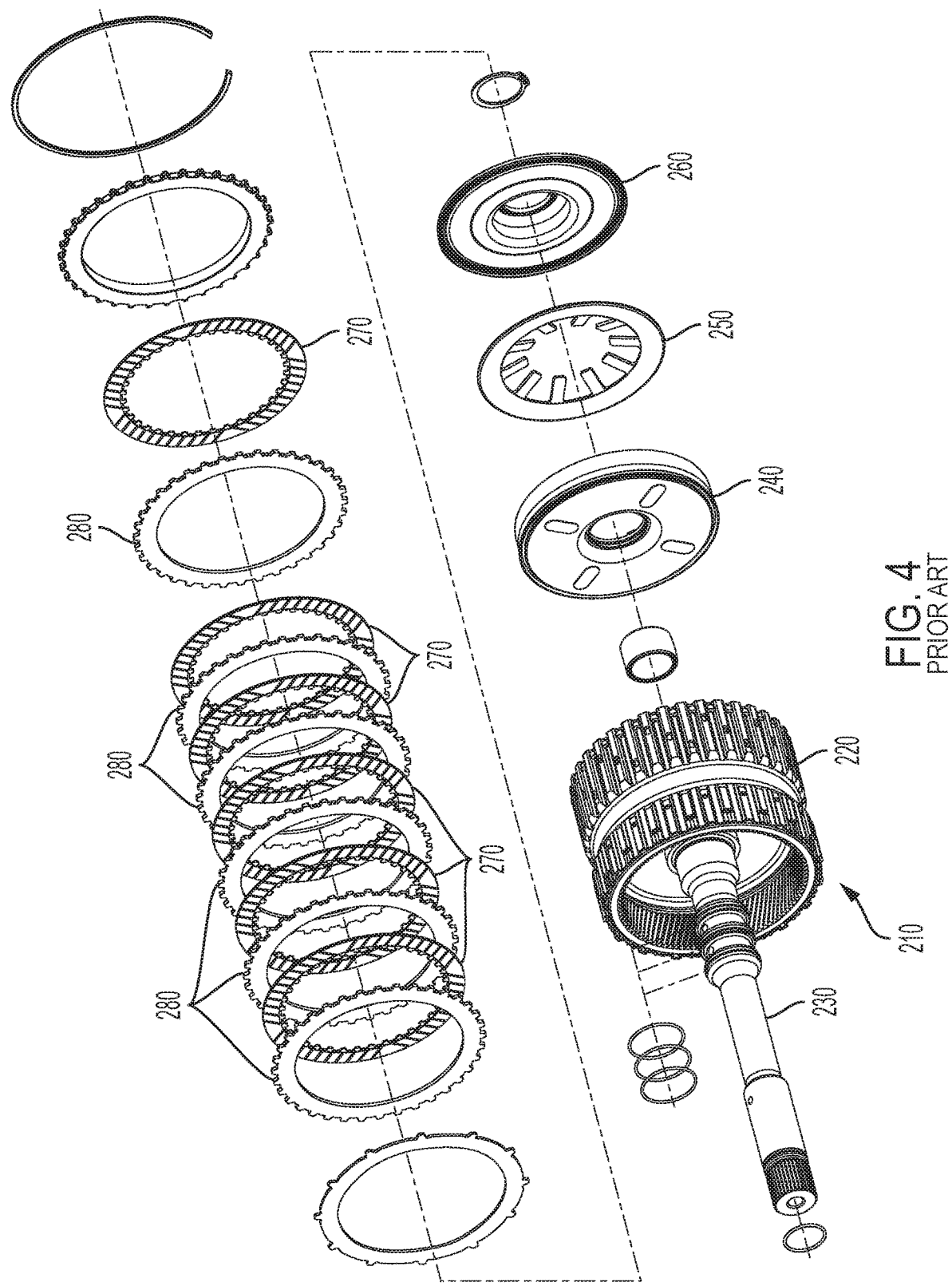
FIG. 4 is an exploded view illustrating a known OE 4-5-6 housing assembly.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 7:
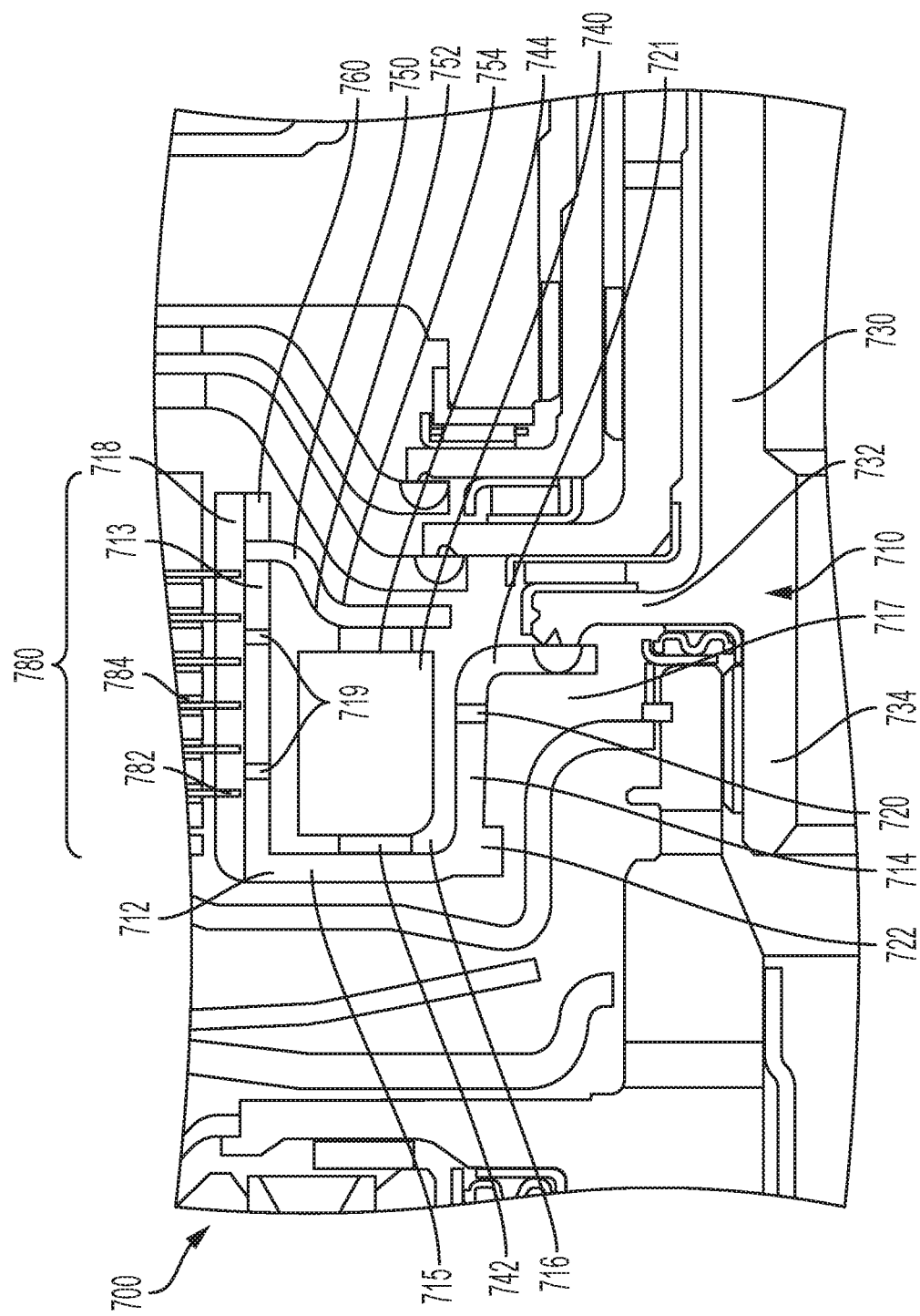
FIG. 7 is a cross-sectional diagram illustrating a portion of an automatic transmission having a clutch hub assembly according to an embodiment.

FIG. 7 is a cross-sectional diagram illustrating a portion of an automatic transmission 700 having a clutch hub assembly 710 according to an embodiment. The clutch hub assembly 710 may include a clutch hub 712, a hub shaft 730, a clutch dampener 740, an apply plate 750 and a retainer ring 760. The clutch hub assembly 710 of present embodiments may be a 4-5-6 clutch hub assembly for use in the General Motors Hydra-Matic 6 Speed rear wheel drive transmission with the 6L45/6L50/6L80/6L90 designations.

In an embodiment, the clutch hub assembly 710 may be the same as the OE clutch assembly 110 with the exception of the clutch hub 712. For example, in an embodiment, the hub shaft 730, the clutch dampener 740, the apply plate 750 and the retainer ring 760 may be the same or substantially the same as the OE hub shaft 130, the OE clutch dampener 140, the OE apply plate 150 and the OE retainer ring 160, respectively. Thus, in an embodiment, the clutch hub assembly 710 may be a modified version of the OE clutch hub assembly 110 in which the OE clutch hub 120 is replaced with the clutch hub 712 of the present embodiments.

In an embodiment, the OE clutch hub assembly 110 may be modified to form the clutch hub assembly 710 by removing the OE clutch hub 120 from the OE hub shaft 130. The clutch hub 712 may be connected to the OE hub shaft 130 (or hub shaft 730).

The clutch hub 712 may be an annular channel-shaped body having an outer radial wall 713, an inner radial wall 714 and a forward axial wall 715 generally defining an inner portion 716 of the annular channel-shaped body. The inner portion 716 may be open in a rearward axial direction. The annular channel-shaped body may extend about a central opening 717.

The outer radial wall 713 includes an inner surface facing the inner portion 716 and an outer surface facing away from the inner portion 716. The outer surface may include a plurality of splines 718. One or more first oil holes 719 may be formed in the outer radial wall 713. The first oil holes 719 are configured to allow for oil to flow out of the inner portion 716 through the outer radial wall 713.

The inner radial wall 714 may include one or more second oil holes 720. The second oil holes 720 are configured to allow for oil to flow from the central opening 717 into the inner portion 716 through the inner radial wall 714. The clutch hub 712 may also include a connecting flange 721 extending from a rear section of the inner radial wall 714. The connecting flange 721 is configured to be connected to the hub shaft 730.

The clutch hub 712 may further include an oil dam 722 projecting radially inward from the inner radial wall 714. The oil dam 722 may stop or impede oil in the central opening 717 from flowing out of the central opening 717 and around the forward axial wall 715 of the clutch hub 712. Accordingly, the oil dam 722 may direct the oil to flow into the second oil holes 720. In an embodiment, the oil dam 722 is positioned axially forward of the connecting flange 721.

The clutch dampener 740 may be an annular ring-shaped body. The clutch dampener 740 may be disposed substantially or entirely within the inner portion 716 of the clutch hub 712. The clutch dampener 740 may include a first axial face 742 facing the forward axial wall 715 and a second axial face 744 facing in the rearward axial direction. The first axial face 742 and the second axial face 744 may each include a bonded friction material.

Figure 8B:
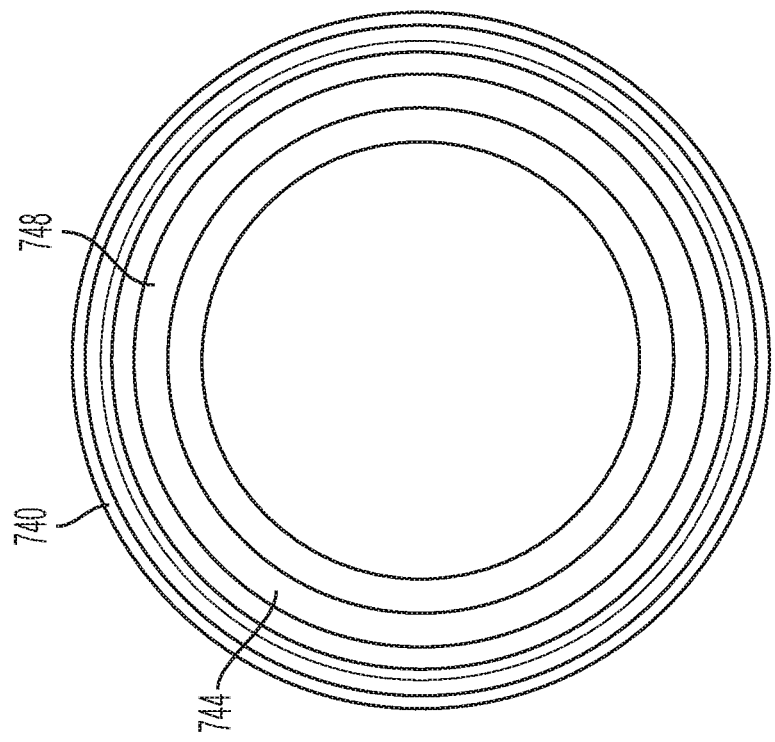
FIGS. 8A and 8B are plan views illustrating the first axial face and the second axial face, respectively, of the clutch dampener, according to an embodiment.
Figure 8A:
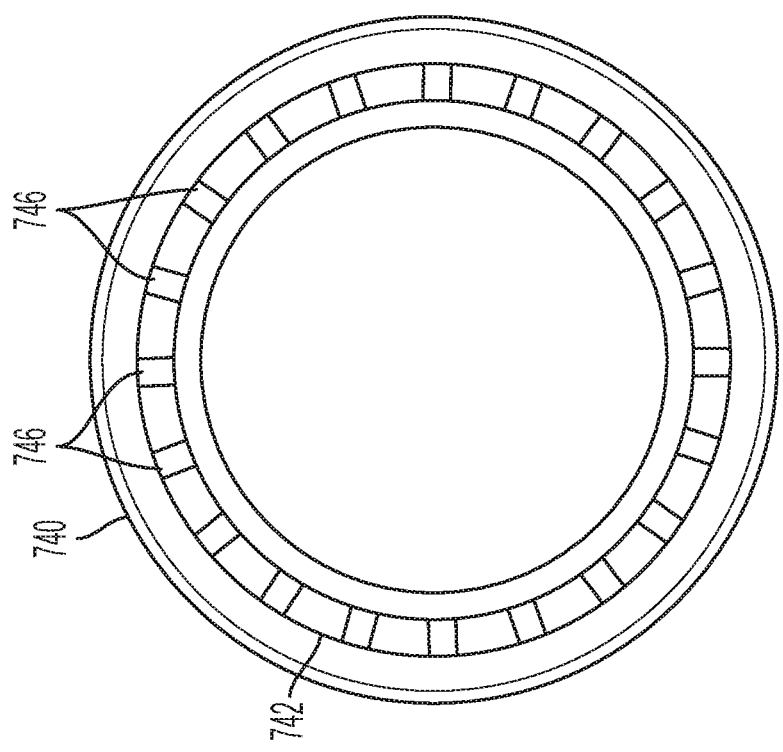

FIGS. 8A and 8B are plan views illustrating the first axial face 742 and the second axial face 744, respectively, of the clutch dampener 740, according to an embodiment. The first axial face 742 may include a plurality radially extending, circumferentially spaced grooves 746. The grooves 746 may be formed in the bonded friction material. The second axial face 744 may form a substantially planar or flush surface 748 (i.e., a surface without grooves). The substantially planar or flush surface 748 may be formed by the bonded friction material.

Referring again to FIG. 7, the apply plate 750 may be an annular ring-shaped body. The apply plate 750 may be positioned adjacent to the second axial face 744 of the clutch dampener 740. The apply plate 750 may include a first axial face 752 facing the second axial face 744 of the clutch dampener 740. The apply plate 750 also includes a second axial face 754 facing in the rearward axial direction.

The retainer ring 760 may be an annular wave spring. The retainer ring 760 may apply a preload to the apply plate 750 in the forward axial direction. Accordingly, the first axial face 752 of the apply plate 750 may be urged against the second axial face 744 of the clutch dampener 740. In an embodiment, a sealing surface may be formed between the first axial face 752 of the apply plate 750 and the second axial face 744 of the clutch dampener 740 under the force of the preload. The preload may also urge the first axial face 742 of the clutch dampener 740 against the forward axial wall 715 of the clutch hub 712. A sealing surface may be formed between the non-grooved portions of the first axial face 742 on the clutch dampener 740 and the forward axial wall 715 of the clutch hub 712. A fluid flow path between the forward axial wall 715 and the first axial face 742 may be provided by the grooves 746 of the clutch dampener 740.

The hub shaft 730 may extend in the axial direction generally rearward from the clutch hub 712. The hub shaft 730 may include a radial shaft flange 732, which may be connected to the connecting flange 721 of the clutch hub 712 using known, suitable fastening techniques. The hub shaft 730 may accommodate the known rear oil feed 512. The hub shaft 730 may include a forward portion 734, extending axially forward relative to the radial shaft flange 732.

In an embodiment, the OE clutch hub assembly 110 of the OE transmission 510 may be modified by replacing the OE clutch hub 120 with the clutch hub 712 of the present embodiments. For example, the OE clutch hub 120 may be removed from the OE hub shaft 130 and the clutch hub 712 may be installed in place of the OE clutch hub 120. In an embodiment, the clutch hub 712 may be connected to the OE hub shaft 130.

The automatic transmission 700 further includes a multiple disc wet clutch pack 780 comprising a plurality of clutch plates 782 and separator clutch discs 784. The clutch plates 782 and the separator clutch discs 784 may be alternatingly positioned with one another. The clutch plates 782 and separator clutch discs 784 may be the same as the OE friction clutch plates 270 and OE separator clutch discs 280 of the OE automatic transmission 510.

Figure 9:
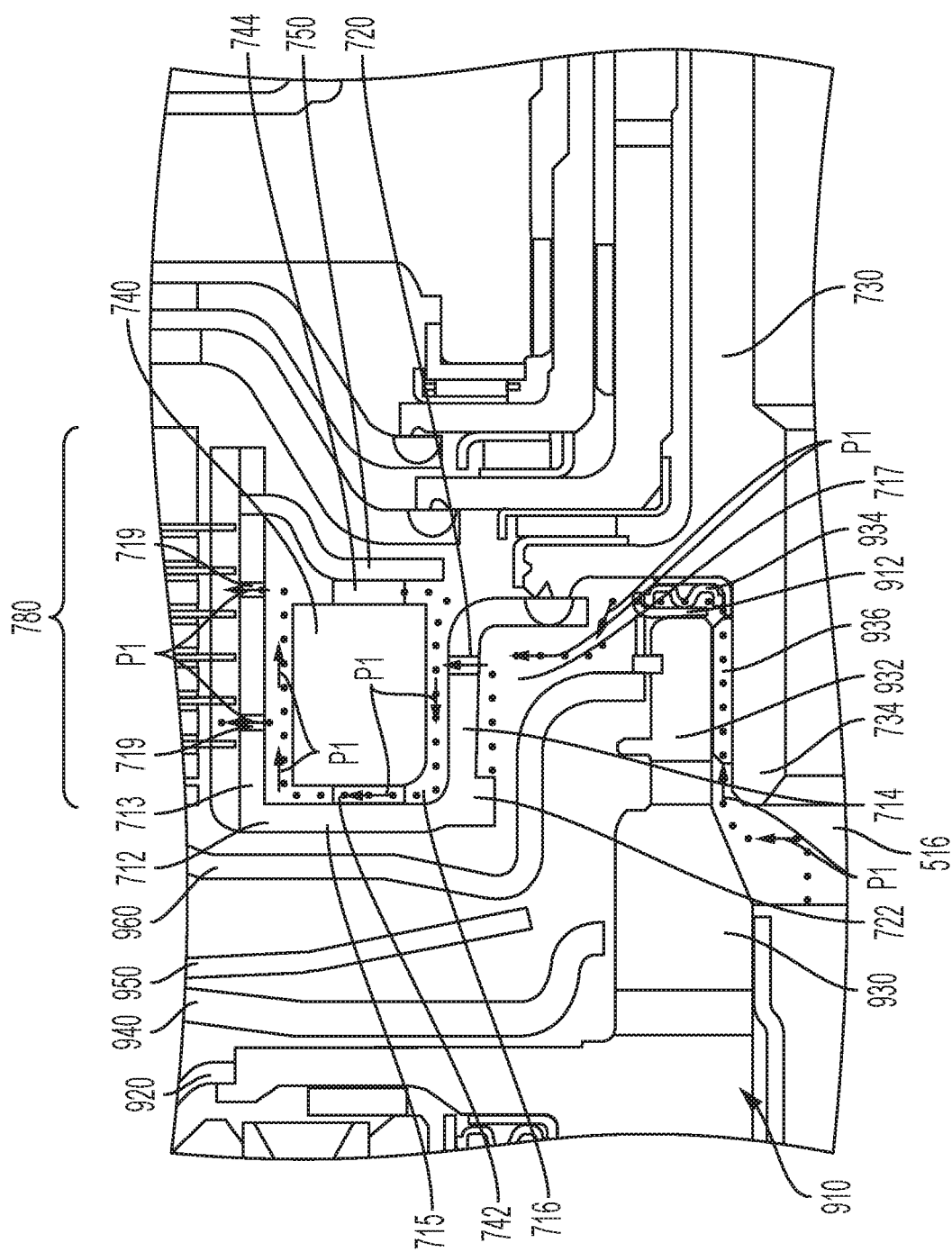
FIG. 9 is a cross-sectional diagram illustrating the portion of the automatic transmission of FIG. 7 having a first oil flow path for the clutch hub assembly according to an embodiment.

FIG. 9 is a diagram illustrating the section of the automatic transmission 700 of FIG. 7, and further illustrating an example of a first oil flow path P1 for the clutch hub assembly 712, according to an embodiment.

The automatic transmission 700 also includes a housing assembly 910. The housing assembly 910 may include a housing body 920, a housing shaft 930, a clutch piston 940, a clutch spring 950 and a clutch piston dam 960.

The housing shaft 930 extends in the axial direction forward from the hub shaft 730. The housing shaft 930 may include a rear portion 932 which overlaps with the forward portion 734 of the hub shaft 730 in the axial direction and is spaced from the forward portion 734 in the radial direction.

An axial gap 934 is formed between the rear portion 932 of the housing shaft 930 and a portion of the hub shaft 730. In addition, a radial gap 936 is formed between the rear portion 932 of the housing shaft 930 and the forward portion 734 of the hub shaft 730. A housing shaft thrust bearing 912 may be disposed between the housing shaft 930 and the hub shaft 730, for example, in the axial and/or radial gap 934, 936.

The housing body 920 may extend radially from the housing shaft 930. The clutch piston 940, clutch spring 950 and clutch piston dam 960 may be disposed axially between the housing body 920 and the clutch hub 712. In addition, the clutch piston 940, the clutch spring 950 and the clutch piston dam 960 may be disposed within the housing body 920.

Figure 5:
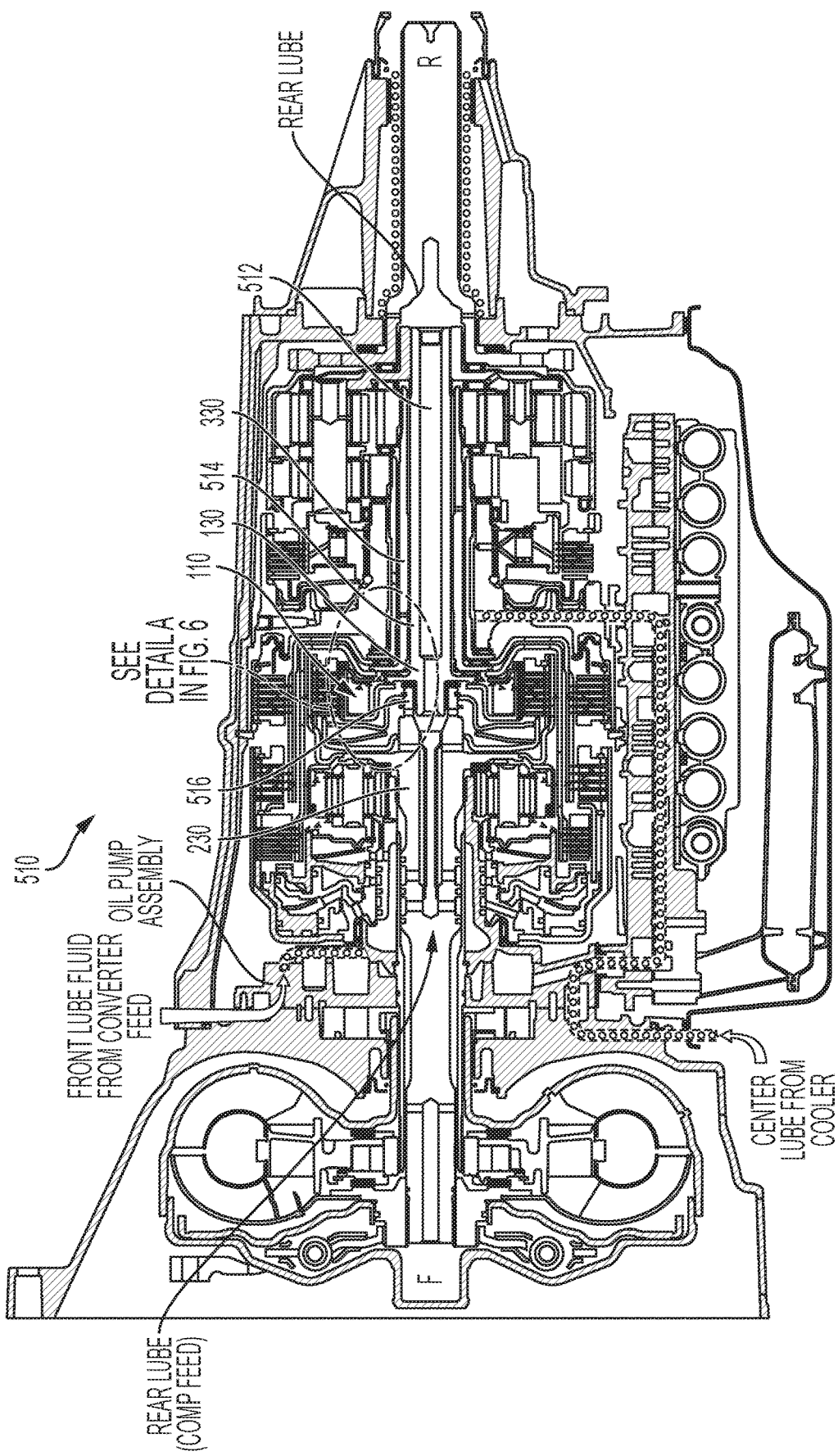
FIG. 5 is a cross-sectional diagram illustrating a known OE automatic transmission.
Figure 6:
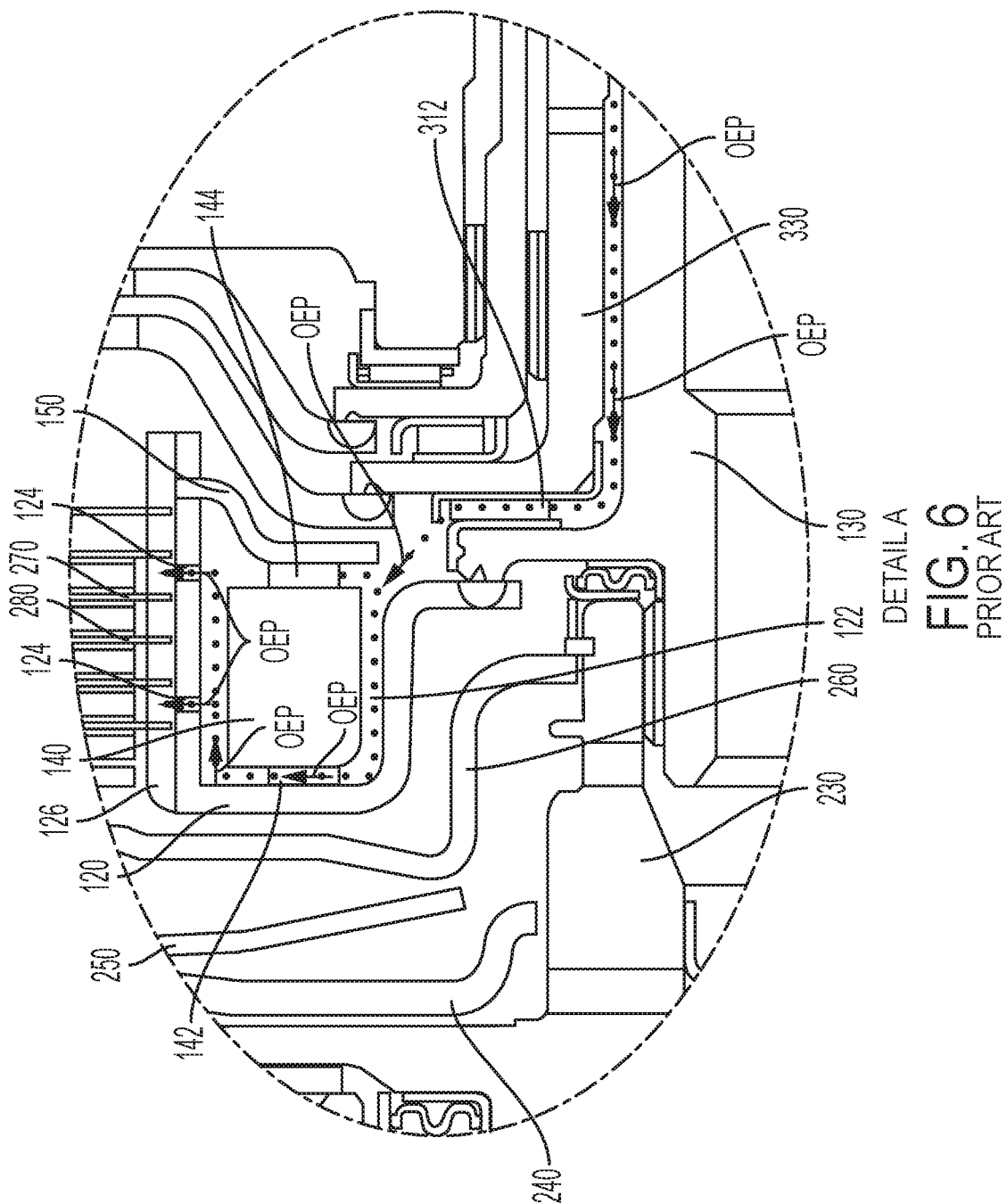
FIG. 6 is a cross-sectional diagram illustrating an enlarged portion of the OE automatic transmission of FIG. 5, including DETAIL A.

As shown in FIG. 5, in the OE automatic transmission 100, oil may be supplied through the OE rear oil feed 512 and the first oil feed 516. However, in the OE automatic transmission 100, oil does not flow into the interior portion 122 of the OE clutch hub from the central opening through an inner radial wall of the OE clutch hub 120. Instead, as shown in FIG. 6, in the OE clutch hub assembly 110, oil flows into the interior portion of the OE club hub 120 through the open rearward facing side of the OE clutch hub 120.

According to embodiments herein, however, the clutch hub 712 is configured to receive oil from the first oil feed 516 due, at least in part, to the one or more second oil holes 720 of the inner radial wall 714 and the oil dam 722. That is, by including the second oil holes 720 in the inner radial wall 714, an oil flow path, i.e., the first oil flow path P1, may be provided through the clutch hub 712 to the clutch pack 780 from the first oil feed 516.

The first oil flow path P1 is indicated by a series of dots and arrows in FIG. 9. In an embodiment, oil may be provided to the clutch hub assembly 710 from a rear oil feed, such as the OE rear oil feed 512 and the first oil feed 516 (FIG. 5). The first oil flow path P1 may extend from the first oil feed 516 between the housing shaft 930 and the hub shaft 730, and through the housing thrust bearing 912.

For example, the first oil flow path P1 may extend through the radial gap 936 between the rear portion 932 of the housing shaft 930 and the forward portion 734 of the hub shaft 730. The first oil flow path P1 may also extend through the axial gap 934 between the rear portion 932 of the housing shaft 930 and the radial shaft flange 732 of the hub shaft 730. In an embodiment, the first oil flow path P1 may extend through the housing thrust bearing 912 in the axial gap 934.

The first oil flow path P1 may further extend radially outward from the axial gap 934 into the central opening 717 of the clutch hub 712. The first oil flow path P1 may extend in the central opening 717 in an area generally bounded by portions of the clutch hub 712, the hub shaft 730 and the housing assembly 910. In an embodiment, the oil dam 722 may substantially restrict or prevent oil from flowing around the inner radial wall 714 to an area axially forward of the forward axial wall 715.

The first oil flow path P1 may further extend through the one or more second oil holes 720 in the inner radial wall 714 and into the inner portion 716 of the clutch hub 712. In the inner portion 716, the first oil flow path P1 may be substantially limited or restricted at the second axial face 744 of the clutch dampener 740, for example, by way of the sealing surface formed by planar or flush surface 748 contacting the first axial face 752 of the apply plate 750 (FIG. 7).

Instead, the first oil flow path P1 may extend around the first axial face 742 of the clutch dampener 740. For example, the first oil flow path P1 may extend between the first axial face 742 and the forward axial wall 715 through one or more of the grooves 746 of the bonded friction material of the first axial face 742 (FIG. 8A). The first oil flow path P1 may extend between the inner surface of the outer radial wall 713 and the clutch dampener 740, and further, through the first oil holes 719 of the outer radial wall 713.

Thus, in an embodiment, cooling and lubricating oil may be provided to the clutch pack 780 via the first oil flow path P1. In an embodiment, the oil may be also supplied to the clutch pack 780 from the OE oil flow path OEP shown in FIG. 6. Thus, oil flow to the clutch pack 780 from the first oil flow path P1 may supplement oil flow to the clutch pack 780 from the OE oil flow path OEP.

In an embodiment, the housing assembly 910 may be same as the OE housing assembly 210.

Figure 10:
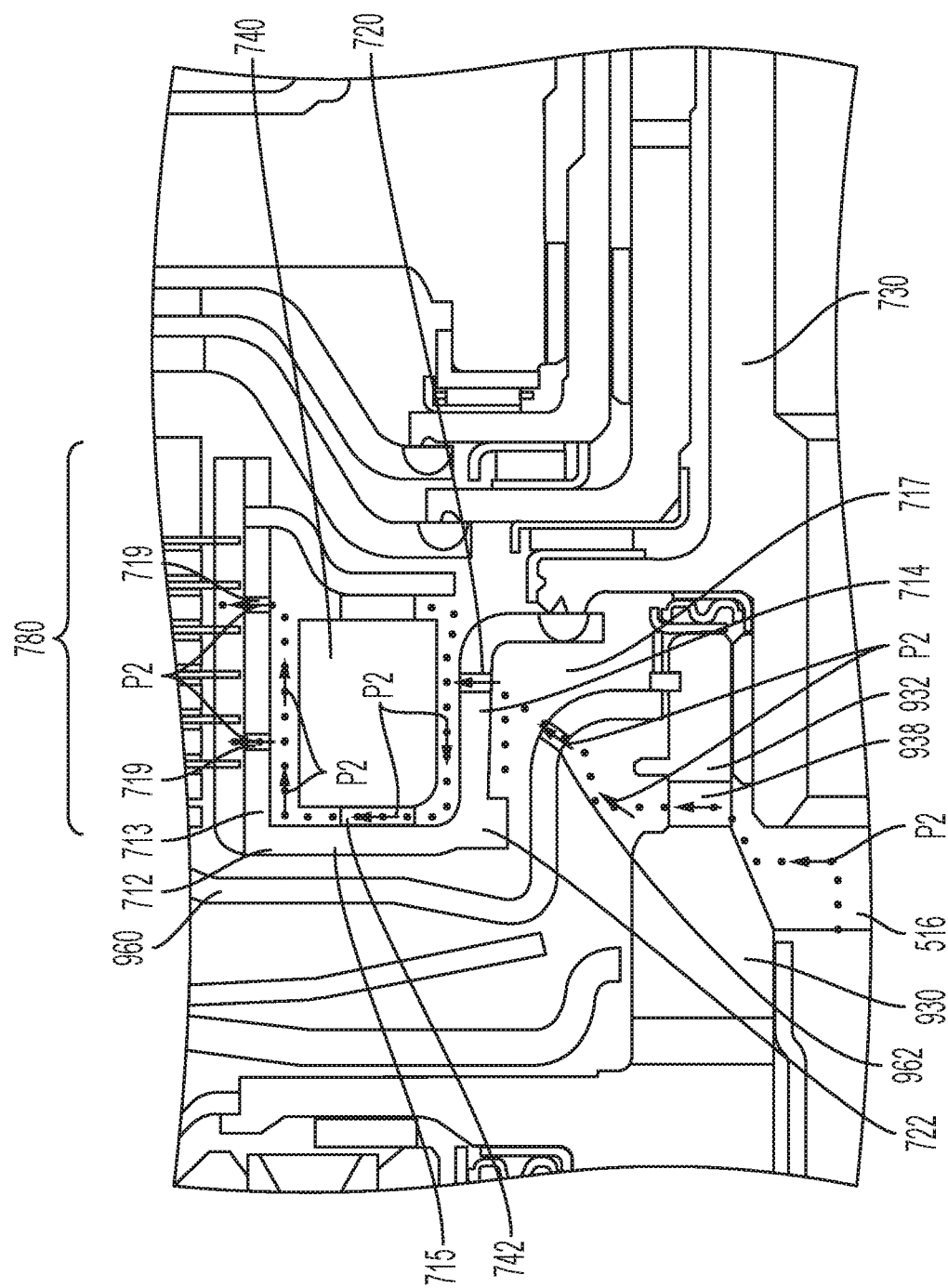
FIG. 10 is a cross-sectional diagram illustrating the portion of the automatic transmission of FIG. 7 having a second oil flow path for the clutch hub assembly according to an embodiment.

FIG. 10 is a diagram illustrating the section of the automatic transmission 700 of FIG. 7, and further illustrating an example of a second oil flow path P2 for the clutch hub assembly 712, according to an embodiment.

In an embodiment, the housing shaft 930 may include one or more oil holes 938 and the piston dam 960 may also include one or more oil holes 962. In an embodiment, the one or more oil holes 938 of the housing shaft 930 may be disposed generally at the rearward portion 932.

Thus, in an embodiment, the second oil flow path P2 may extend from the first oil feed 516 through the one or more oil holes 938 of the housing shaft 930. The second oil feed path P2 may extend through a space between the housing shaft 930 and the piston dam 960. The second oil flow path P2 may then extend through the one or more oil holes 962 of the piston dam 960 into the central opening of the clutch hub 717.

The second oil flow path P2 may be limited or restricted by the oil dam 722 of the clutch hub 712 such that oil is substantially prohibited from flowing around a front side of the forward axial wall 715 of the clutch hub 712. The second oil flow path P2 may further extend through the clutch hub 712 to provide oil to the clutch pack 780 in a manner similar to the first oil flow path P1 described above. That is, the second oil flow path P2 may extend through the one or more second oil holes 720 of the inner radial wall 714 of the clutch hub 712 into the inner portion 716. The second oil flow path P2 may then extend between the first axial face 742 of the clutch dampener 740, for example, through the grooves 746 of the bonded friction material, and the forward axial wall 715, and through the first oil holes 719 of the outer radial wall 713.

Accordingly, the lubricating and cooling oil may be supplied to the clutch pack 780 the second oil flow path P2. Oil supplied from the second oil flow path P2 may be the sole or primary source of oil provided to the clutch pack 780, or may supplement oil supplied to the clutch pack 780 from the first oil flow path P1 and/or the OE oil flow path OEP.

In an embodiment, the housing assembly 910 may optionally be a modified version of the OE housing assembly 210. For example, the housing assembly 910 may be formed by modifying or replacing the OE clutch piston dam 260 with the clutch piston dam 960 of the present embodiments.

For example, in an embodiment, the OE housing assembly 210 may be modified by machining the OE clutch piston dam 260 to include the one or more oil holes 962. Alternatively, the OE clutch piston dam 260 may be removed from the OE automatic transmission and replaced with the clutch piston dam 960 of the present embodiments, including the one or more oil holes 962.

The housing assembly 910 may be used in the OE automatic transmission 510 in conjunction with a 4-5-6 clutch hub assembly, such as the clutch hub assembly 710 of the present embodiments. Thus, the housing assembly 910 may be a 4-5-6 housing assembly 910 in the automatic transmission 700.

Figure 11:
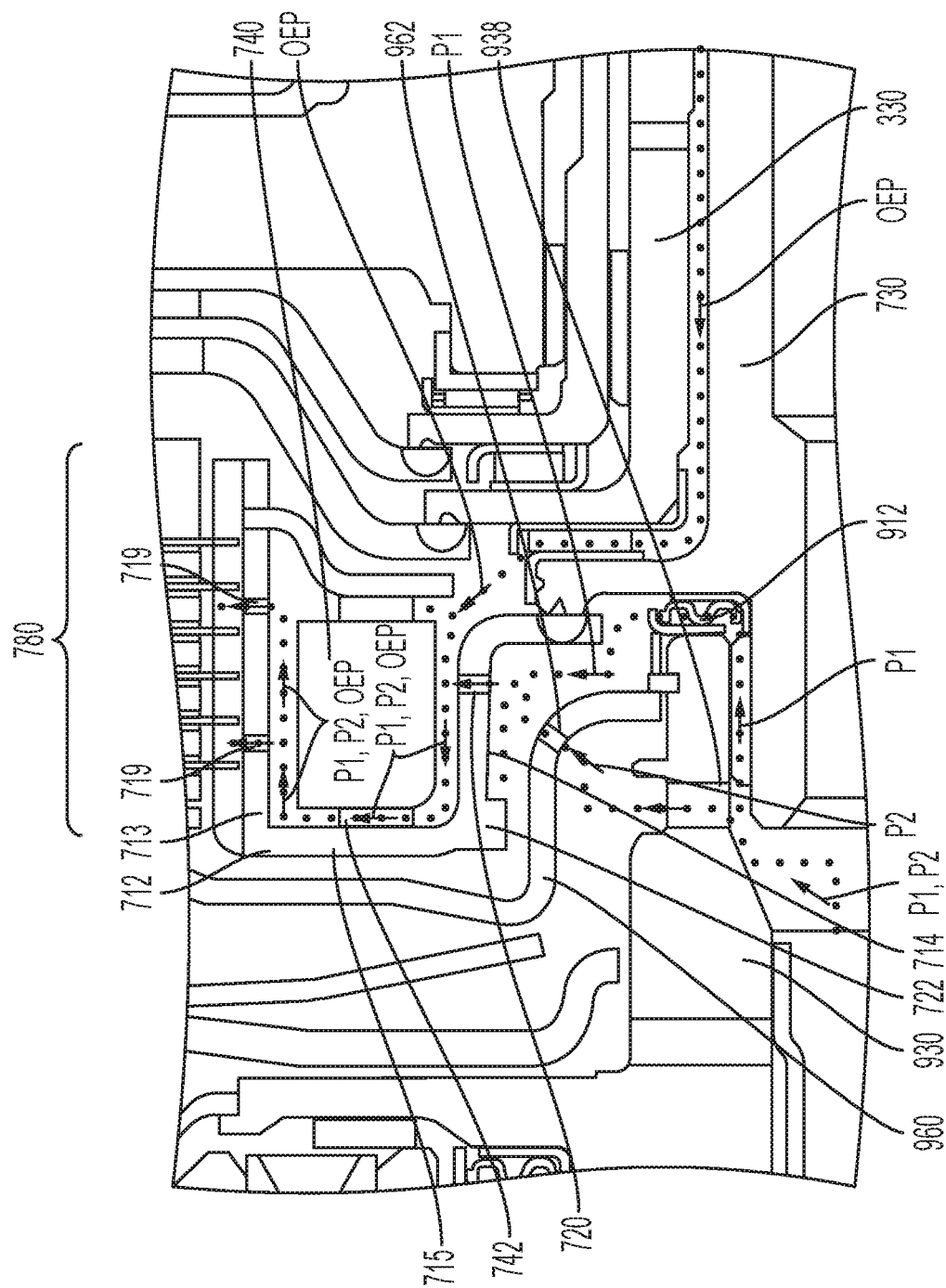
FIG. 11 is a cross-sectional diagram illustrating the portion of the automatic transmission of FIG. 7 having a combination of oil flow paths for the clutch hub assembly according to an embodiment.

FIG. 11 is a diagram illustrating the section of the automatic transmission 700 of FIG. 7, and further illustrating examples of the first oil flow path P1, second oil flow path P2, and the OE oil flow path OEP used together for the clutch hub assembly 710, according to an embodiment. The automatic transmission 700 may supply oil to the clutch pack 780 through any of the OE oil flow path OEP, the first oil flow path P1, and/or the second oil flow path P2, or combinations thereof. For example, oil may be supplied using the OE oil flow path and either or both of the first oil flow path P1 and the second oil flow path P2. In this manner, a volume flow rate of cooling and lubricating oil supplied to the clutch pack 780 may be increased compared to the OE automatic transmission 510. That is, oil supplied to the clutch pack 780 from the first and/or second oil flow paths P1, P2 may supplement oil supplied from the OE oil flow path OEP.

Further, in an embodiment, additional oil may be supplied to the clutch pack 780 increasing a width and/or depth of the grooves 746 of the first axial face 742 of the clutch dampener 740 compared to the OE clutch dampener 140. For example, the OE clutch dampener 140 of the OE clutch hub assembly 110 may be replaced with a modified clutch dampener having grooves on the first axial face which have a greater width and/or depth than the grooves of the OE clutch dampener. The modified clutch dampener may be an OE clutch dampener that has been removed and machined to increase the groove width and/or depth. Alternatively, the modified clutch dampener may be a newly manufactured component which may replace the OE clutch dampener. In an embodiment, the clutch dampener 740 may be the modified clutch dampener.

In the embodiments above, an OE clutch hub assembly 110 may be modified by replacing the OE clutch hub 120 with the clutch hub 712 of the present embodiments. Thus, the clutch hub assembly 710 of the present embodiments may be a modified version of the OE clutch hub assembly 110. The clutch hub assembly 710 according to embodiments herein may provide for increased oil flow to the clutch pack 780 in the manner described above.

Portions of the automatic transmission 700 shown in the drawings, or which are not expressly described otherwise above may be considered to be OE components of the OE automatic transmission 510. Further, the automatic transmission 700 of the present embodiments may be a modified version of the OE automatic transmission 510. For example, the OE automatic transmission 510 may be modified by replacing the OE clutch hub 120 with the clutch hub 712 of the present embodiments, to replace the OE housing shaft 230 with the housing shaft 930 of the present embodiments, and to replace the OE piston dam 160 with the piston dam 760 of the present embodiments. Further still, in an embodiment, the OE clutch dampener 140 may be replaced with the clutch dampener 740 of the present embodiments, the clutch dampener 740 having modified grooves 746 configured to allow for increased radially outward flow of oil between the clutch dampener 740 and the forward axial wall 715.

It is understood that the features described with respect to any of the embodiments above may be implemented, used together with, or replace features described in any of the other embodiments above. It is also understood that description of some features may be omitted in some embodiments, where similar or identical features are discussed in other embodiments.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, in is understood that terminology referring to directions or relative orientations, such as, but not limited to, "upper" "lower" "raised" "lowered" "top" "bottom" "above" "below" "alongside" "left" and "right" are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A clutch hub assembly comprising:
   a clutch hub defining an inner portion between an outer radial wall, an inner radial wall and a forward axial wall, the clutch hub extending about a central opening;
   one or more first oil holes extending through the outer radial wall;
   one or more second oil holes extending through the inner radial wall;
   an oil dam extending radially inward from the inner radial wall;
   a connecting flange extending radially inward from the inner radial wall, the connecting flange positioned axially rearward from the oil dam;
   a hub shaft connected to the connecting flange;
   a clutch dampener disposed in the inner portion, the clutch hub dampener having a first axial face having a plurality of grooves facing the forward axial wall and a second axial face facing an open side of the clutch hub;
   an apply plate positioned adjacent to the second axial face of the clutch dampener; and
   a retainer ring configured to apply a preload to the apply plate to urge the apply plate toward the second axial face of the clutch dampener and the first axial face of the clutch dampener toward the forward axial wall,
   wherein an oil flow path extends from the central opening through the one or more second oil holes into the inner portion, between the clutch dampener and the forward axial wall, and through the one or more first oil holes.

2. The clutch hub assembly of claim 1, wherein the outer radial wall has an outer surface, and the outer surface comprises a plurality of splines.

3. The clutch hub assembly of claim 1, wherein the oil flow path extends in at least one groove of the plurality of grooves of the first axial face between the clutch dampener and the forward axial wall.

4. The clutch hub assembly of claim 1, wherein the open side faces an axially rearward direction.

5. The clutch hub assembly of claim 4, wherein another oil flow path extends into the inner portion through the axially rearward facing open side.

6. An automatic transmission comprising:
   a clutch hub defining an inner portion between an outer radial wall, an inner radial wall and a forward axial wall, the clutch hub extending about a central opening;
   one or more first oil holes extending through the outer radial wall;
   one or more second oil holes extending through the inner radial wall;
   an oil dam extending radially inward from the inner radial wall;
   a connecting flange extending radially inward from the inner radial wall, the connecting flange positioned axially rearward from the oil dam;
   a hub shaft connected to the connecting flange;
   a clutch dampener disposed in the inner portion, the clutch hub dampener having a first axial face having a plurality of grooves facing the forward axial wall and a second axial face facing an open side of the clutch hub;
   an apply plate positioned adjacent to the second axial face of the clutch dampener;
   a retainer ring configured to apply a preload to the apply plate to urge the apply plate toward the second axial face of the clutch dampener and the first axial face of the clutch dampener toward the forward axial wall; and
   a housing assembly comprising a housing shaft and a piston dam, the housing shaft comprising one or more housing shaft oil holes and the piston dam comprising one or more piston dam oil holes,
   wherein an oil flow path extends from the central opening through the one or more second oil holes into the inner portion, between the clutch dampener and the forward axial wall, and through the one or more first oil holes.

7. The automatic transmission of claim 6, wherein the oil flow path is a first oil flow path, and the first oil flow path further extends between the hub shaft and the shaft to the central opening.

8. The automatic transmission of claim 6, wherein the oil flow path is a second oil flow path, and the second oil flow path further extends through the one or more housing shaft oil holes and the one or more piston dam oil holes to the central opening.

9. The automatic transmission of claim 6, wherein the open side faces an axially rearward direction.

10. The automatic transmission of claim 9, wherein another oil flow path extends into the inner portion through the axially rearward facing open side.

* * * * *